(No Model.)
F. STITZEL.
PROCESS OF AND APPARATUS FOR IMPROVING SPIRITS.
No. 265,344. Patented Oct. 3, 1882.
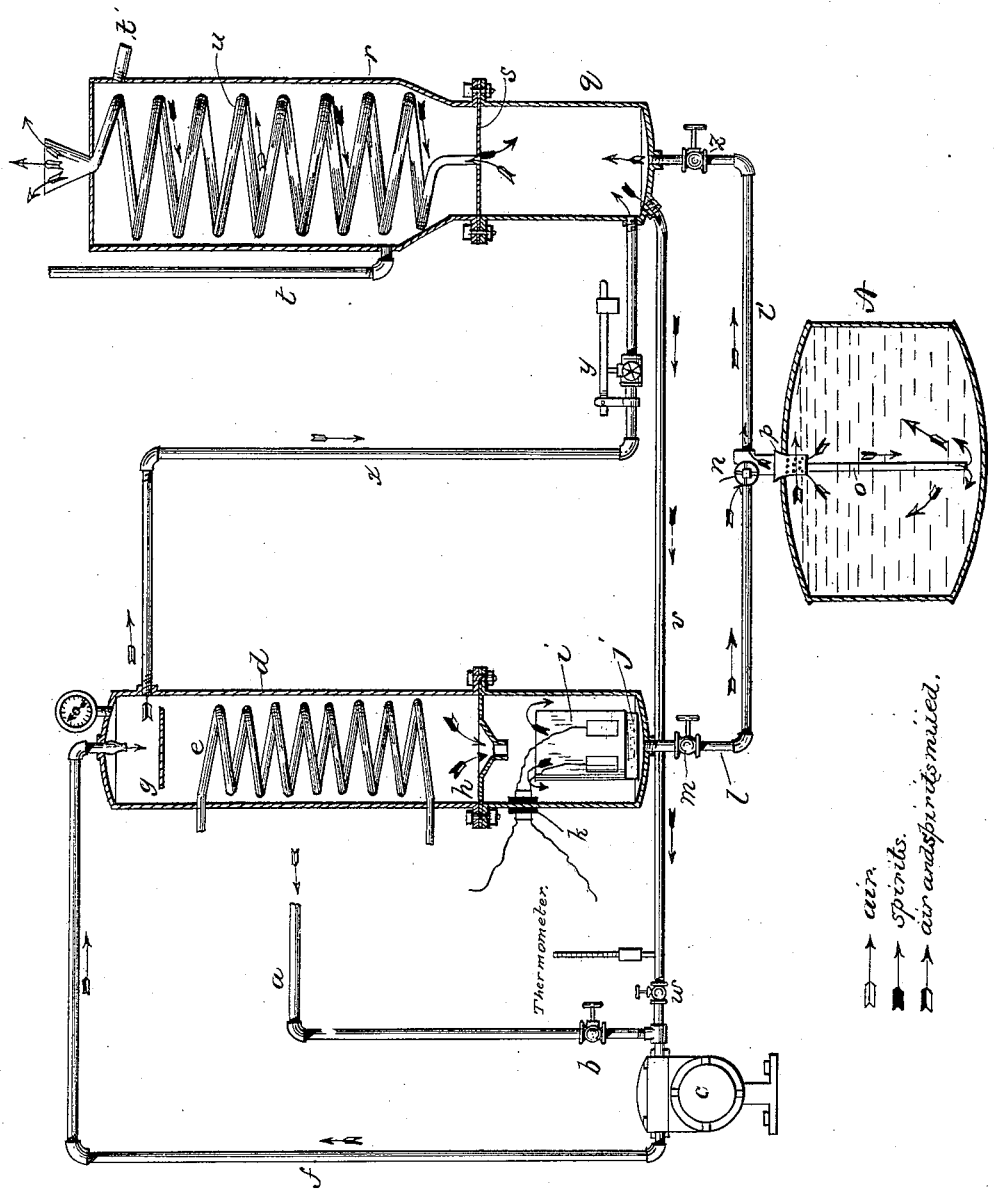
Witnesses.
Franck L. Ourand
Geo. M. Finckel
Inventor.
Frederick Stitzel
by his attorney,
Wm. H. Finckel

UNITED STATES PATENT OFFICE.

FREDERICK STITZEL, OF LOUISVILLE, KENTUCKY.

PROCESS OF AND APPARATUS FOR IMPROVING SPIRITS.

SPECIFICATION forming part of Letters Patent No. 265,344, dated October 3, 1882.

Application filed June 5, 1882. (No model.)

*To all whom it may concern:*

Be it known that I, FREDERICK STITZEL, a citizen of the United States, residing at Louisville, in the county of Jefferson and State of Kentucky, have invented certain new and useful Improvements in Methods of and Apparatus for Improving Spirits; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention relates to a method of and apparatus for imparting to spirits the qualities and excellence usually acquired by age. The idea of aging liquors by artificial means is old, and as illustrations of such means I may refer to the mechanical agitators and the oxidizing processes now well known. For a further illustration reference may be had to my United States Letters Patent No. 253,125, dated January 31, 1882, upon which this present invention may be considered an improvement.

This invention consists, first, in commingling air and spirits in a forcing apparatus, after which the mixed air and spirits are expanded under heat in a closed vessel, with or without electrolyzation, then subjected to agitation, and finally separated, whereby the liquor is oxidized and aged or improved.

The invention consists, second, in means for carrying out this method or process, comprising a receiver supplied with cold, a forcing apparatus, a heating-chamber with or without an electrolyzation apparatus, an agitating-vessel, connecting-pipes, and controlling-cocks therein, combined and arranged to operate substantially as hereinafter specified and claimed.

The accompanying drawing illustrates my invention in sectional elevation.

The letter $a$ designates an air-supply pipe, provided with a controlling-cock, $b$, leading to an air-forcing apparatus, $c$—as, for instance, a reciprocating pump.

$d$ is a close cylindrical vessel, provided with a heating-coil, $e$, and communicating with the pump by pipe $f$, said pipe opening into the top of said vessel with a suitable nozzle.

$g$ is a horizontal plate or deflector, arranged within the vessel beneath the nozzle of pipe $f$. A funnel-like diaphragm, $h$, is arranged in the vessel $d$ below the heating-coil.

I prefer to employ an apparatus for effecting electrolysis in my invention, and to arrange such apparatus in the vessel $d$ below the funnel $h$, a simple form of which apparatus consists of glass jar $i$, resting upon a glass base, $j$, laid in the bottom of the vessel $d$, this base affording a stable support for the jar. It is obvious that the base $j$ will be of such shape or construction relatively to the vessel $d$ as to permit the liquid in the vessel $d$ to pass the base to escape from the said vessel $d$. Within the jar $i$ two plates of platinum are suspended, and these plates connected by conductors with a suitable source of electricity, these conductors being introduced into the metal vessel $d$ through insulating stuffing-boxes or glands $k$, arranged therein. The vessel $d$ is provided with a suitable gage to indicate the pressure therein.

$l$ is a pipe, provided with a cock, $m$, leading from the bottom of the vessel $d$, and in this pipe is a cock, $n$, of a discharge-pipe, $o$. The cock $n$ may form the connection or union of pipes $l$ and $o$.

$p$ is a strainer, into which the pipe $l'$ opens, and thence leads to and opens in the bottom of a chamber, $q$. Superposed upon this chamber is a reservoir, $r$, separated therefrom by a diaphragm, $s$. A cooling agent is introduced into this reservoir through a pipe, $t$, and if water be used an overflow-pipe, $t'$, will be provided.

$u$ is a coil of pipe within the reservoir, with its open mouth outside the reservoir, and opening through the diaphragm $s$ into the chamber $q$. The chamber $q$ communicates by means of a pipe, $v$, having a cock, $w$, with the forcing apparatus $c$, and also communicates with the upper end of the vessel $d$ by means of pipe $x$, having a safety-valve, $y$, arranged therein. The pipe $l'$ is also provided with a cock, $z$, arranged therein below the chamber $q$.

In operation the discharge-pipe $o$ and strainer $p$ will open into a barrel, A, containing the spirits to be improved, the bung-hole of the barrel affording convenient access thereinto. The cocks $b$, $w$, $m$, and $z$ being opened, a cooling agent is admitted into the reservoir $r$, and I prefer to use cold water in a constant stream as such cooling agent. The forcing apparatus is started and a heating agent—as, for instance, steam—through the coil $e$ is applied to the vessel $d$. Air enters the forcing apparatus through the pipe $a$, and is discharged through the pipe $f$ into vessel $d$. As soon as there is sufficient pressure—say ten pounds to the square inch—in the vessel $d$ the air will leave said vessel through the pipe $l$ and pass through the cock $n$ and discharge-pipe $o$ into the barrel A, causing a violent agitation of its contents and increasing the bulk thereof. The mixed air and spirits under the continued pressure of the incoming air will be forced from the barrel through the strainer $p$, pipe $l'$, and cock $z$ into the chamber $q$, where there will be a partial separation of the air and spirits, a complete separation thereof being subsequently effected by condensation and gravity in the coil $u$. The spirits pass from the chamber $q$ through the pipe $v$ into the forcing apparatus $c$, where they are again mixed with air, the air previously used escaping from the coil $u$ into the atmosphere. At this point the actual operation of my improvement begins. The spirits from the chamber $q$ and the air coming in through pipe $a$ combine in about equal volumes under control of the cocks $w$ $b$, are thoroughly mixed by the action of the pump and forced by it with great violence through the pipe $f$ on the plate $g$ in the vessel $d$, whereby the spirits, largely divided, will drop through the funnel $h$ into the glass jar $i$. An electric current being now established in this jar of spirits, the spirits will be decomposed by electrolytic action, whereby the spirits undergo oxidation—one element of aging or improving such liquor. The electrolyzed spirits, overflowing the jar, again mix with the air, and pass from the vessel $d$ through the pipe $l$ into the barrel, where the pressure of the air forces another portion of the spirits from the barrel to undergo the operation in the manner just described, and so on continuously until the entire contents of the barrel are treated. I have found that a barrel containing from forty-five to fifty gallons (United States standard) of new spirits may by my process, in about one and a half hour, be so improved as to have the flavor and qualities of spirits two years old. Any excess of pressure in the vessel $d$ escapes through the pipe $x$, through the coil $u$, and in its passage through the chamber $q$ serves to additionally agitate and thereby improve the spirits in said chamber.

In the operation of my apparatus I gradually raise the temperature to which the air and spirits are subjected to about 140° to 150° Fahrenheit, maintaining as far as possible a uniform temperature of that elevation.

In order to facilitate the reading of the drawing I have employed thereon the white-feathered arrows to indicate air, the black, spirits, and black and white combined mixed spirits and air.

In this apparatus I have taken advantage of the known fact that spirits are improved by agitation, oxidation, and heat. The first I effect primarily in the barrel and also in the chamber $q$, the second in the vessel $d$, chamber $q$, and barrel, the heat being supplied in the vessel $d$. The electrolysis effects the decomposition of the water in the spirits, the hydrogen combining with aldehydes, forming ethylic alcohol, and the oxygen acting upon the vegetable oil forming ethers. The improved spirits are allowed to cool in the barrel.

As hereinbefore intimated, I prefer to use electrolysis in my process; but it may be omitted and still very satisfactory results be obtained. Hence it is not an indispensable element of my invention.

The details of my apparatus may be varied without departing from the spirit of my invention.

What I claim is—

1. The method of improving spirits, the same consisting in mixing air and spirits under pressure, subjecting the same to heat and electrolysis in a closed vessel, afterward agitating the same, and finally separating them, substantially as and for the purpose described.

2. The combination of an air forcing or pressure apparatus, a heating-vessel, a receptacle for spirits, a separating and distributing apparatus, a pipe provided with a cock connecting the heating-vessel and receptacle, a pipe provided with a cock for connecting the receptacle and separating and distributing apparatus, and a pipe provided with a cock connecting the separating and distributing apparatus with the air forcing or pressure apparatus, and a pipe connecting the air forcing or pressure apparatus and the heating-vessel, substantially as shown and described, whereby spirits are taken from the receptacle, circulated under pressure through these said apparatus, and returned to the receptacle, as specified.

3. A pump for mixing and propelling air and spirits under pressure, a heating-vessel into which the mixed air and spirits are forced by the pump and therein expand, a spirits-supply vessel, and a receiving-chamber combined with connecting-pipes and controlling-cocks, constructed and arranged substantially as shown and described, whereby the spirits are in continuous motion through the apparatus in constantly new or changing quantities.

4. The method of improving spirits, the same consisting in taking constantly new quantities of the same from their container, mixing air therewith under pressure, and forcing the same into and through heating, agitating, oxidizing, and separating apparatus in a continuous round, substantially as set forth.

5. An apparatus for improving spirits, the same consisting of an air-forcing mechanism, $c$, air-pipe $a$, and cock $b$ therein, a vessel, $d$, having a heating-coil, $e$, and diaphragms $g$ and $h$, spirits-vessel A, with pipes $l\ o$ for connecting it with the vessel $d$ and strainer $p$, and pipe $l'$ for connecting it with the chamber $q$, combined with such chamber, reservoir $r$, separated from said chamber by partition $s$, coil $u$, and pipes $v\ x f$, and valves $w\ m\ n\ y\ z$, substantially as and for the purpose described.

In testimony whereof I affix my signature in presence of two witnesses.

FREDERICK STITZEL.

Witnesses:
ANDREW ZORN,
WM. D. REILING.